(No Model.)

G. SCRIVANOW.
GALVANIC BATTERY.

No. 270,702. Patented Jan. 16, 1883.

WITNESSES:
E. B. Bolton
Geo. Bainton

INVENTOR:
Gregoire Scrivanow
By his Attorneys,
Burke, Fraser Kennett

UNITED STATES PATENT OFFICE.

GRÉGOIRE SCRIVANOW, OF PARIS, FRANCE, ASSIGNOR TO HORACE HAMLINE ELDRED, OF LONDON, ENGLAND.

GALVANIC BATTERY.

SPECIFICATION forming part of Letters Patent No. 270,702, dated January 16, 1883.

Application filed May 23, 1882. (No model.) Patented in France July 30, 1881, No. 144,181; in Germany August 4, 1881; in Austria August 6, 1881, and in Belgium October 26, 1881, No. 56,071.

*To all whom it may concern:*

Be it known that I, GRÉGOIRE SCRIVANOW, a subject of the Russian Emperor, residing at Paris, France, have invented certain Improvements in Galvanic Batteries, of which the following is a specification.

This invention belongs to the class of powerful batteries, and it has the advantage over other batteries with which I am familiar of producing a constant and energetic current with a relatively-low velocity, which peculiarly adapts it to all the uses to which ordinary batteries are applied.

My improved battery element is composed of three essential parts—namely, a plate or piece of prepared carbon or graphite, a plate or piece of carefully-amalgamated zinc, and a novel depolarizing-paste applied to the carbon plate as a coating, or interposed between the carbon and zinc. The employment and composition of this depolarizing-paste forms the characteristic feature of my present invention.

The paste is composed of the following ingredients in about the proportions named—that is to say: ammonia chloride of mercury, $m$ ($HgCl_2$) $n$ ($NH_4Cl$), ten (10) parts, by weight; chloride of sodium, three (3) parts, by weight; chloride of silver, one-fourth ($\frac{1}{4}$) part, by weight.

The ammonia chloride of mercury may be prepared as follows: Boil for about five hours in a porcelain vessel a concentrated solution of pure chloride of ammonium (sal-ammoniac) with one-fourth of its weight of oxide of mercury and a trace of chloride of zinc until a grayish-white precipitate is formed. This precipitate is thrown on a filter and thoroughly washed with plenty of water, when it is dried and ground to a coarse powder. The salt thus obtained is definite, stable, not affected by dryness or humidity of the atmosphere, and easily preserved.

The reactions which take place in the preparation of the double chloride by the use of oxide of mercury are, I believe, as follows: The materials used are expressed by $(HgO) + 4(NH_4Cl) = (HgO) + (N_4H_{16}Cl)$. Eliminating in the process one molecule of water, $H_2O$, and two molecules of free ammonia, $N_2H_6$, and there is left $(HgCl_2)$ and 2 $(NH_4Cl)$ or simply a double proportion of the chloride of ammonium.

In forming the depolarizing-paste the ingredients named are added to a slightly-acid solution of chloride of zinc (50°) until a paste is produced of the proper consistency. It is important, however, to triturate the mass thoroughly in a porcelain mortar in order to insure the intimate mixture of the ingredients. The carbon, which may be of any suitable form, and which has been previously treated with paraffine, is coated with the depolarizing-paste, which is spread over its surface to a uniform depth of one to two millimeters. The paste is covered with five or six thicknesses of Swedish or Berzelin's filtering-paper saturated with a solution composed of chloride of zinc (50°) and chloride of sodium mixed together in equal parts. This paper is secured to the carbon at its edges by means of paraffine. The combination of the zinc with the carbon thus prepared forms an element of great constancy. The difference of potential is about 1.3 volts, and the internal resistance is very feeble.

The reactions which take place in a battery of this kind are various. The dominant one, however, is the decomposition by the zinc of the chloro-mercuriate of ammonium, accompanied with the formation of a double chloride of zinc and ammonium and a small quantity of zinc oxychloride. The free mercury, with traces of silver, is found in the form of amalgam, partly on the carbon and partly on the zinc. The chlorides of sodium and silver which enter into the composition of the paste perform the part of a chlorinating agent and prevent the production of protochloride of mercury, (mercurial chloride.) This battery element is capable of being arranged in various forms and shapes, according to the particular purpose to which it is to be applied. In the accompanying drawings I have shown four of these various arrangements, which I will now describe.

Figure 1 is a vertical longitudinal sectional view, illustrating the preferred construction of the element for telegraphic and telephonic purposes. In this case the element is composed of a tubular carbon, C, into which a rod of zinc, Z, is inserted, the annular space between them being filled with the depolarizing-paste P. Such elements may be grouped to form a battery of either quantity or intensity.

Figure 1:
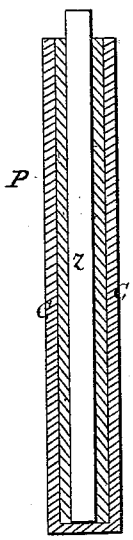
Figure 2:
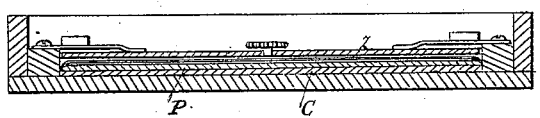
Fig. 2 is a longitudinal vertical section, and Fig. 3 a plan of the element when adapted for medical use. In this construction the carbon and zinc are in the form of plates.
Figure 3:
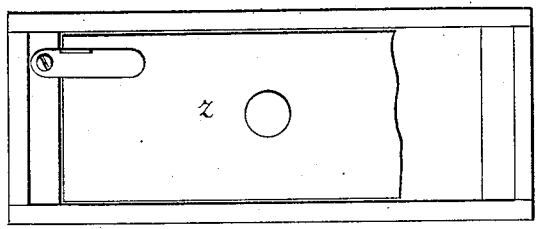
Figure 4:
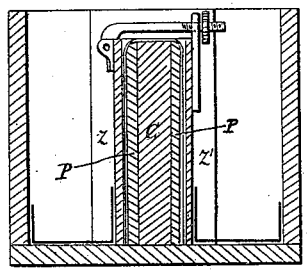
Fig. 4 is a sectional elevation, showing a double pile, the carbon plate C being covered with paste on both its faces, and two zincs, Z Z' being employed.
Figure 5:
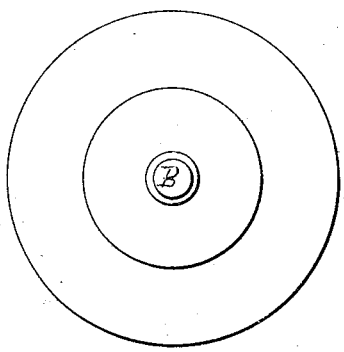
Fig. 5 is a plan, and Fig. 6 a mid-section, of a form of the element suitable for the button of an electric bell.
Figure 6:
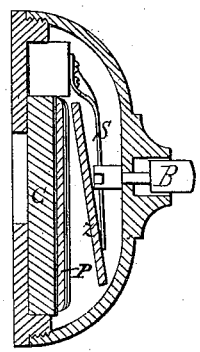

The zinc plate is held normally out of contact with the paste P by means of any suitable spring, as shown, and is pressed into contact therewith by the button. S is the spring, and B the button. The zinc is electrically connected with one wire of the circuit and the carbon with the other wire, and when the button is pressed the circuit is closed. The parts will be insulated, of course, in the usual way.

I have not deemed it necessary to show or describe the wire connections and other appurtenances of the element, as these may be the same as are usually employed in batteries.

Having thus described my invention, I claim—

1. The depolarizing composition for electrical batteries herein described, which consists of ammonia chloride of mercury, chloride of silver, and chloride of sodium mixed in about the proportions set forth.

2. A battery element comprising a zinc, a carbon, and an interposed depolarizing-paste composed of ammonia chloride of mercury, chloride of silver, and chloride of sodium mixed in about the proportions set forth.

3. The combination, to form a battery element, of the zinc, the previously-paraffined carbon, the depolarizing-paste P, compounded as described, and the cover of filtering-paper saturated with the chlorides of zinc and sodium, all arranged substantially as set forth.

In witness whereof I have hereunto signed my name in the presence of two subscribing witnesses.

GRÉGOIRE SCRIVANOW.

Witnesses:
  ROBT. M. HOOPER,
  CHARLES MARDEBY.